United States Patent [19]
Auer et al.

[11] Patent Number: 5,564,642
[45] Date of Patent: Oct. 15, 1996

[54] DEVICE FOR WINDING STRIPS OF PHOTOGRAPHIC FILM

[75] Inventors: Josef Auer, Unterhaching; Guenter Czapla, Germering, both of Germany

[73] Assignee: Agfa Geavert, Munich, Germany

[21] Appl. No.: 450,790

[22] Filed: May 25, 1995

[30] Foreign Application Priority Data

Jun. 14, 1994 [DE] Germany ............... 44 20 660.7

[51] Int. Cl.⁶ .................................. G03B 23/02
[52] U.S. Cl. ........................................ 242/348
[58] Field of Search ............... 242/348, 348.1, 242/348.3; 352/78 R; 354/275; 355/72

[56] References Cited

U.S. PATENT DOCUMENTS

| | | | |
|---|---|---|---|
| 2,180,222 | 11/1939 | Clarke | 242/348 |
| 3,502,283 | 3/1970 | Gross | 242/348 |
| 3,620,477 | 11/1971 | Penn | 242/348 |
| 3,662,972 | 5/1972 | Egan | 242/348 |
| 3,834,650 | 9/1974 | Hall | 242/348 |
| 4,069,989 | 1/1978 | Pfeifer et al. | 242/348 |
| 4,285,480 | 8/1981 | Parker | 242/348.1 |
| 4,637,711 | 1/1987 | Fujisawa et al. | |
| 5,465,134 | 11/1995 | Palmer et al. | 242/348 |

FOREIGN PATENT DOCUMENTS

| | | | |
|---|---|---|---|
| 837962 | 3/1970 | Canada | 242/348 |
| 1221013 | 5/1960 | France | 242/348 |
| 1288905 | 7/1965 | Germany . | |
| 3403796A1 | 8/1985 | Germany | 242/348.1 |

*Primary Examiner*—John P. Darling
*Attorney, Agent, or Firm*—Furgang & Milde, LLP

[57] ABSTRACT

A device for winding strips of photographic film inside a housing. A film-guide slot opens into the housing's approximately cylindrical interior. A film reel rotates freely in the housing interior without a positive drive and demarcates, in conjunction with the inner surface of the housing, a more or less annular film-guide channel. The film-guide slot opens more or less tangentially into the interior channel.

16 Claims, 1 Drawing Sheet

DEVICE FOR WINDING STRIPS OF PHOTOGRAPHIC FILM

BACKGROUND OF THE INVENTION

The present invention relates to a device for winding strips of photographic film about a film reel disposed inside a housing having a film-guide slot that opens into its approximately cylindrical interior.

The German Patent Publication NO. OS 3 437 222 describes a photographic printer. Negatives on a strip of film from which prints are produced are advanced past a scanner by a film-advance mechanism in the initial stage of the printing process. In the second stage the negatives are introduced individually into a printing point in the opposite direction and the images are projected onto light-sensitive paper. Between scanning and printing the film is inserted into an essentially circular-cylindrical intermediate reservoir. This device works reliably enough as long as the film being processed is as wide as the reservoir. When narrower films are handled, however, they cannot be guided precisely at the sides, and they can twist upon emerging and have a detrimental effect on the overall procedure.

The German Patent Publication No. OS 3 828 978 describes an intermediate film reservoir that eliminates these problems. The film leader is captured by a clip and the film is wound onto a motorized reel. This device is very reliable, although the mechanization and the need to synchronize it with the film advance through the scanning and printing points make it relatively expensive.

SUMMARY OF THE INVENTION

The object of the present invention is to provide an improved device for winding strips of photographic film that can very reliably handle strips of various formats while still being simpler and less expensive than the film reservoir devices known in the art.

This object, as well as other objects which will become apparent from the discussion that follows, are achieved, in accordance with the present invention, by providing a device of the type described above wherein the film reel rotates freely within the housing interior without a positive drive and demarcates, in conjunction with an inner surface of the housing, a more or less annular film-guide channel, and wherein the film-guide slot opens more or less tangentially into the film-guide channel.

The narrow gap or channel between the inner surface of the housing and the reel itself ensures precise guidance of strips of various width, preventing twisting and similar problems. It turns out that a freely rotating reel is far more effective for unwinding film than for winding it. When a strip is inserted, it usually slides along the inner surface of the housing, so that the reel itself is not involved in the initial winding procedure. Only when the film exhibits a stubborn tendency to curl can it catch to some extent between the housing and the reel, causing the reel itself to rotate as the film is inserted. On the other hand, it is particularly important for the reel to be able to rotate freely when the film is unwound. The outer coils are captured, tightening the leader against the core of the reel enough to prevent slippage. As the tension continues, the reel begins to rotate and the individual windings can be neatly withdrawn.

To allow films that exhibit a particularly stubborn tendency to curl to be inserted smoothly into the reservoir, the reel must be mounted with as little friction as possible. Expensive ball bearings have been demonstrated to be unnecessary; the reel can simply be rotatably mounted on a brass shaft.

When films that exhibit almost no tendency to curl are inserted, it is important for the inner surface of the housing to be as low-friction as possible. This feature will also prevent scratching the film.

It has been discovered that it becomes difficult to continue inserting a strip of film once there are more than four or five coils of film on the reel. The diameter of the reel should accordingly be approximately 130 mm, in which case ordinary 35 mm film with 36 frames and approximately 1.6 m in length can be wound around the reel in just four laps. The device should be redimensioned for films that are much longer. To ensure smooth insertion of the strip into the gap between the reel and the inner surface of housing, the gap should taper between 7 and 18 mm in height. The gap will accordingly be spacious enough to accommodate several laps of film while keeping straight the leader of any film that exhibits a stubborn tendency to curl. It is preferable for at least one section of the gap to taper inward so that the film leader will enter a sort of hopper as it leaves the film-guide channel. It has been demonstrated particularly practical for the gap to be 15 mm high at the mouth of the film-guide channel and approximately 9 mm high at its narrowest point.

The reel should have not only as little friction, but also as little inertia as possible. It should accordingly have spokes extending outward to a cylindrical element instead of a solid core in order to save as much weight as possible.

Liquid-crystal polymers have been demonstrated to be a particularly practical material for the housing and reel. Especially outstanding is Vectra X 028, available commercially from Hoechst AG, Germany. This material is very wear-resistant, exhibits low-friction and easily surrenders electrostatic charge.

To prevent very narrow films from catching between the sides of the housing and the reel, the sides preferably have an annular rib or projection concentric with the reel and engaging behind the outer cylindrical element of the reel to provide a barrier.

For a full understanding of the present invention, reference should now be made to the following detailed description of the preferred embodiments of the invention as illustrated in the accompanying drawings.

DESCRIPTION OF THE PREFERRED EMBODIMENT

Figure 1:
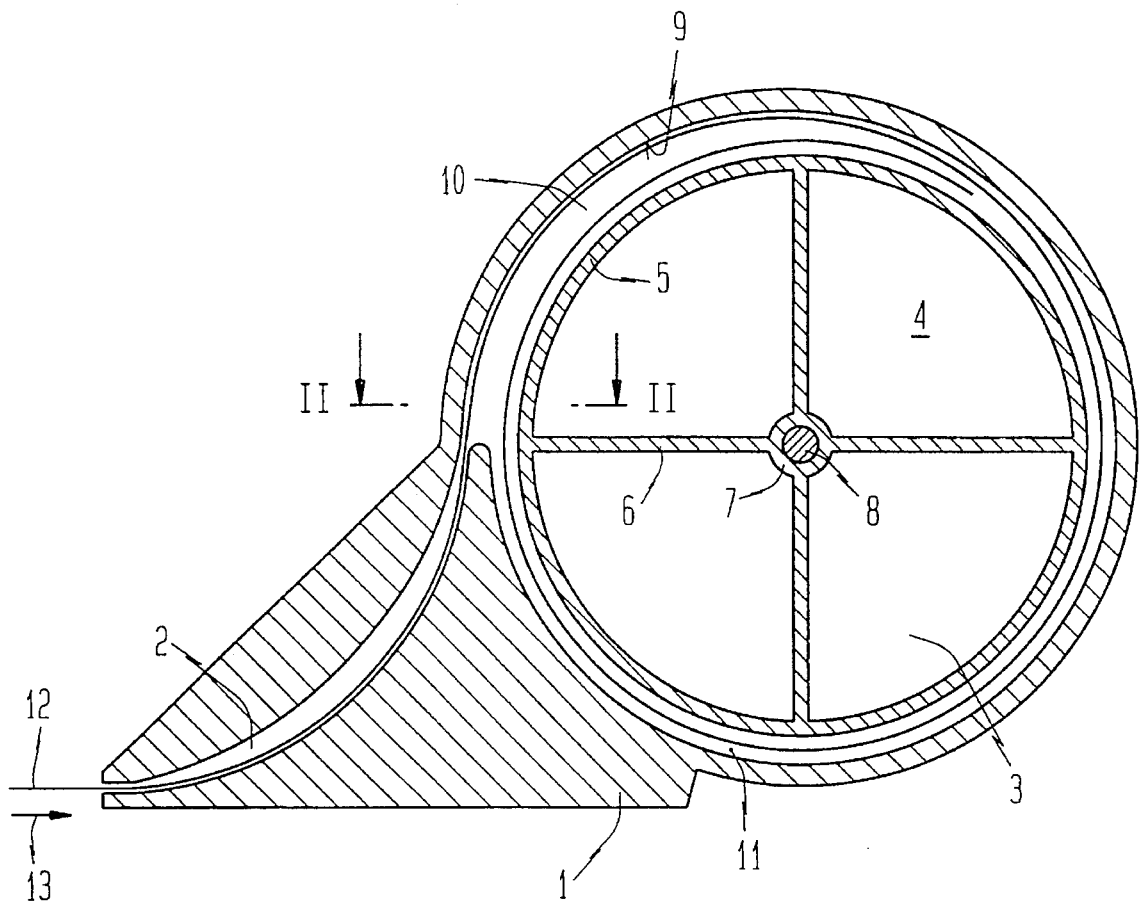
FIG. 1 illustrates a device for winding strips of film in accordance with the present invention.

The preferred embodiment of the present invention will now be described with reference to FIGS. 1 and 2 of the drawing. Identical elements in the two figures are designated with the same reference numerals.

A housing 1 includes a film-guide slot 2 and an approximately cylindrical interior 3. The interior 3 accommodates a reel 4. The reel 4 has a cylindrical outer element 5 supported on a hub 7 by way of spokes 6. The hub 7 rotates on a brass shaft 8. The inner surface 9 of the housing 1 and the outer surface of the cylindrical element 5 of the reel 4 demarcate a gap or channel. The gap comprises a tapering section 10 and a section 11 of constant width.

When a strip of film 12 is inserted into the film-guide slot 2 of the reservoir device in the direction indicated by arrow 13 its first coil comes to rest, depending on its tendency to curl, against the inner surface 9 of the housing 1. As the film is inserted farther, its leader enters the gap between the first coil and the outer surface of the reel 4 during the second lap. If the film exhibits only a slight tendency to curl, the reel will not begin to rotate until the third or fourth coils have become established.

As the film 12 is withdrawn in the direction opposite to that indicated by arrow 13, before the reel 4 begins to rotate and while the outer coil is resting against the inner surface 9 of housing 1, the coils will first be drawn tight with the loose one removed from the film roll. All the remaining coils will rest tightly against the reel. The lowest coil will no longer be able to move over the outer surface of the reel 4. The reel will consequently begin to rotate as the film continues to be extracted, so that the film can easily be entirely withdrawn.

The film reservoir in accordance with the present invention makes possible savings beyond those obtainable at the state of the art with no loss of reliability. The narrow gap 10 and 11 between the inner surface 9 of the housing 1 and the outer surface of the reel 4 renders the device appropriate for films of different width in that the film does not need to be guided by the sides of the housing.

Figure 2:
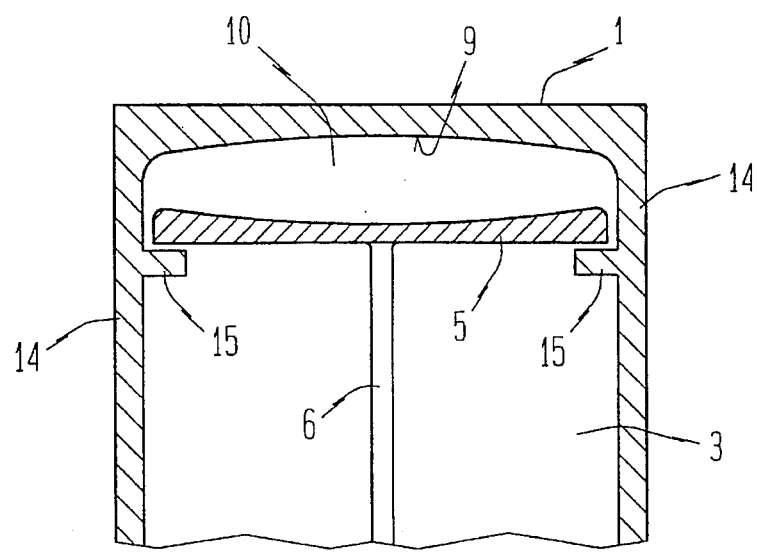
FIG. 2 is a section through part of the device illustrated in FIG. 1 taken along the line II—II in FIG. 1.

As shown in FIG. 2, both the inner surface 9 of the housing 1 and the outer surface of the reel 4 are preferably made concave to help center the film. This measure also helps prevent scratching.

As is also shown in FIG. 2, each of the side walls 14 of housing 1 is provided with a ring-shaped rib 15 which extends into the interior 3 of the housing beneath the cylindrical element 5 of the reel to prevent narrow (e.g. A 110) strips of film from catching between the housing and the reel and interfering with insertion and extraction.

There has thus been shown and described a novel device for winding strips of photographic film which fulfills all the objects and advantages sought therefor. Many changes, modifications, variations and other uses and applications of the subject invention will, however, become apparent to those skilled in the art after considering this specification and the accompanying drawing which disclose the preferred embodiment thereof. All such changes, modifications, variations and other uses and applications which do not depart from the spirit and scope of the invention are deemed to be covered by the invention, which is to be limited only by the claims which follow.

What is claimed is:

1. In a device for winding strips of photographic film about a film reel disposed inside a housing having a film-guide slot that opens into an approximately cylindrical interior, the improvement wherein the film reel rotates freely within the housing interior without a positive drive and demarcates, in conjunction with an inner surface of the housing, a substantially annular film-guide channel; wherein the film-guide slot opens substantially tangentially into the film-guide channel; and wherein the reel is mounted for rotation with minimum friction around a brass shaft.

2. The device defined in claim 1, wherein inner surfaces of the housing are low-friction surfaces.

3. The device defined in claim 1, wherein the outside diameter of the reel ensures that the longest film strip to be processed will be wound with no more than four turns.

4. In a device for winding strips of photographic film about a film reel disposed inside a housing having a film-guide slot that opens into an approximately cylindrical interior, the improvement wherein the film reel rotates freely within the housing interior without a positive drive and demarcates, in conjunction with an inner surface of the housing, a substantially annular film-guide channel; wherein the film-guide slot opens substantially tangentially into the film-guide channel; and wherein a gap forming the channel between the reel and the inner surface of the housing tapers between 7 and 18 mm in height.

5. The device defined in claim 4, wherein the channel tapers inward and is largest where the film-guide slot enters the channel.

6. The device defined in claim 4, wherein inner surfaces of the housing are low-friction surfaces.

7. The device defined in claim 4, wherein the outside diameter of the reel ensures that the longest film strip to be processed will be wound with no more than four turns.

8. In a device for winding strips of photographic film about a film reel disposed inside a housing having a film-guide slot that opens into an approximately cylindrical interior, the improvement wherein the film reel rotates freely within the housing interior without a positive drive and demarcates, in conjunction with an inner surface of the housing, a substantially annular film-guide channel; wherein the film-guide slot opens substantially tangentially into the film-guide channel; and wherein the reel includes spokes supporting an outer cylindrical element in order to save weight.

9. The device defined in claim 8, wherein inner surfaces of the housing are low-friction surfaces.

10. The device defined in claim 8, wherein the outside diameter of the reel ensures that the longest film strip to be processed will be wound with no more than four turns.

11. In a device for winding strips of photographic film about a film reel disposed inside a housing having a film-guide slot that opens into an approximately cylindrical interior, the improvement wherein the film reel rotates freely within the housing interior without a positive drive and demarcates, in conjunction with an inner surface of the housing, a substantially annular film-guide channel; wherein the film-guide slot opens substantially tangentially into the film-guide channel; and wherein the housing and reel are made of a liquid-crystal polymer.

12. The device defined in claim 11, wherein inner surfaces of the housing are low-friction surfaces.

13. The device defined in claim 11, wherein the outside diameter of the reel ensures that the longest film strip to be processed will be wound with no more than four turns.

14. In a device for winding strips of photographic film about a film reel disposed inside a housing having a film-guide slot that opens into an approximately cylindrical interior, the improvement wherein the film reel rotates freely within the housing interior without a positive drive and demarcates, in conjunction with an inner surface of the housing, a substantially annular film-guide channel; wherein the film-guide slot opens substantially tangentially into the film-guide channel; and wherein interior of the housing at end faces thereof is delimited by side walls and an outer surface of the reel is formed by a cylindrical element having an inside diameter, and wherein said side walls each include an interior annular projection concentric with the reel and having an outside diameter slightly less than the inside diameter of the cylindrical element.

15. The device defined in claim 14, wherein inner surfaces of the housing are low-friction surfaces.

16. The device defined in claim 14, wherein the outside diameter of the reel ensures that the longest film strip to be processed will be wound with no more than four turns.

* * * * *